US011044644B2

(12) United States Patent
Liu et al.

(10) Patent No.: US 11,044,644 B2
(45) Date of Patent: Jun. 22, 2021

(54) METHOD AND APPARATUS FOR IMPLEMENTING A SPLIT MEASUREMENT CONFIGURATION FOR DIFFERENT CONNECTIONS

(71) Applicant: NOKIA SOLUTIONS AND NETWORKS OY, Espoo (FI)

(72) Inventors: Yang Liu, Beijing (CN); Amaanat Ali, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/072,387

(22) PCT Filed: Nov. 17, 2016

(86) PCT No.: PCT/EP2016/078021
§ 371 (c)(1),
(2) Date: Jul. 25, 2018

(87) PCT Pub. No.: WO2017/129283
PCT Pub. Date: Aug. 3, 2017

(65) Prior Publication Data
US 2019/0075495 A1    Mar. 7, 2019

(30) Foreign Application Priority Data
Jan. 27, 2016    (IN) .............................. 201611002943

(51) Int. Cl.
*H04W 36/00* (2009.01)
*H04W 76/15* (2018.01)
(Continued)

(52) U.S. Cl.
CPC ...... *H04W 36/0058* (2018.08); *H04B 17/382* (2015.01); *H04W 24/10* (2013.01);
(Continued)

(58) Field of Classification Search
CPC ......... H04W 36/0058; H04W 36/0009; H04W 24/10; H04W 36/0094; H04W 88/06; H04B 17/382
(Continued)

(56) References Cited

U.S. PATENT DOCUMENTS

2012/0244903 A1*  9/2012  Fong ................... H04W 8/20
                                                      455/517
2014/0056243 A1   2/2014  Pelletier et al.
(Continued)

FOREIGN PATENT DOCUMENTS

GB    2522665 A     8/2015
WO    2015002466 A2 1/2015

OTHER PUBLICATIONS

International Search Report and Written Opinion for International Application No. PCT/EP2016/078021, dated Dec. 20, 2016 (11 pages).
(Continued)

*Primary Examiner* — Charles N Appiah
*Assistant Examiner* — Nicole M Louis-Fils
(74) *Attorney, Agent, or Firm* — Brake Hughes Bellermann LLP (57) ABSTRACT

A method and apparatus may include transmitting a measurement split request to a network node. The measurement split request designates a first measurement layer and a second measurement layer. The first measurement layer corresponds to a measurement configuration for the apparatus. The second measurement layer corresponds to a measurement configuration for the network node. The method may also include receiving an acknowledgement that the measurement split request is accepted by the network node. The method may also include transmitting the measurement configuration for the apparatus and the mea-
(Continued)

surement configuration for the network node to a user equipment.

15 Claims, 9 Drawing Sheets

(51) Int. Cl.
*H04W 88/06* (2009.01)
*H04W 88/10* (2009.01)
*H04B 17/382* (2015.01)
*H04W 24/10* (2009.01)

(52) U.S. Cl.
CPC ... *H04W 36/0009* (2018.08); *H04W 36/0094* (2013.01); *H04W 76/15* (2018.02); *H04W 88/06* (2013.01); *H04W 88/10* (2013.01)

(58) Field of Classification Search
USPC .......................................................... 455/437
See application file for complete search history.

(56) References Cited

U.S. PATENT DOCUMENTS

| | | | |
|---|---|---|---|
| 2015/0358866 A1 | 12/2015 | Xu et al. | |
| 2016/0057687 A1* | 2/2016 | Horn | H04W 24/10 370/331 |
| 2016/0219475 A1* | 7/2016 | Kim | H05K 999/99 |
| 2016/0353457 A1* | 12/2016 | Park | H04B 7/024 |
| 2017/0257183 A1* | 9/2017 | Vikberg | H04W 28/0231 |
| 2018/0063736 A1* | 3/2018 | Sadeghi | H04W 24/10 |

OTHER PUBLICATIONS

Office Action for European Application No. 16798152.1, dated May 27, 2019, 6 pages.
Communication pursuant to Article 94(3) EPC for European Application 16 798 152.1, dated Oct. 2, 2019, 6 pages.
Office Action for European Application No. 16798152.1, dated Apr. 26, 2021, 9 pages.

* cited by examiner

METHOD AND APPARATUS FOR IMPLEMENTING A SPLIT MEASUREMENT CONFIGURATION FOR DIFFERENT CONNECTIONS

CROSS-REFERENCE TO RELATED APPLICATIONS

This application is a national stage entry of PCT Application No. PCT/EP2016/078021 filed Nov. 17, 2016, entitled "METHOD AND APPARATUS FOR IMPLEMENTING A SPLIT MEASUREMENT CONFIGURATION FOR DIFFERENT CONNECTIONS" which claims the benefit of priority of Indian Application No. 201611002943 filed Jan. 27, 2016, both of which are hereby incorporated by reference in their entireties.

BACKGROUND

Field

Certain embodiments of the present invention relate to implementing a split measurement configuration for different connections.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include transmitting, by a first network node, a measurement split request to a second network node. The measurement split request designates a first measurement layer and a second measurement layer. The first measurement layer corresponds to a measurement configuration for the first network node, and the second measurement layer corresponds to a measurement configuration for the second network node. The method may also include receiving an acknowledgement that the measurement split request is accepted by the second network node. The method may also include transmitting the measurement configuration for the first network node and the measurement configuration for the second network node to a user equipment.

In the method of the first embodiment, the first network node may include a first access point, and the second network node comprises a second access point.

In the method of the first embodiment, the method may also include receiving, by the first network node, a measurement report from the user equipment. The measurement report relates to secondary cells different than secondary cells of the second network node.

In the method of the first embodiment, the method may also include performing a mobility/handover procedure based on the received measurement report.

According to a second embodiment, an apparatus may include first transmitting means to transmit a measurement split request to a network node. The measurement split request designates a first measurement layer and a second measurement layer. The first measurement layer corresponds to a measurement configuration for the apparatus. The second measurement layer corresponds to a measurement configuration for the network node. The apparatus may also include first receiving means to receive an acknowledgement that the measurement split request is accepted by the network node. The apparatus may also include second transmitting means to transmit the measurement configuration for the apparatus and the measurement configuration for the network node to a user equipment.

In the apparatus of the second embodiment, the apparatus may include a first access point, and the network node may include a second access point.

In the apparatus of the second embodiment, the apparatus may also include second receiving means to receive a measurement report from the user equipment. The measurement report relates to secondary cells different than secondary cells of the network node.

In the apparatus of the second embodiment, the apparatus may also include performing means to perform a mobility/handover procedure based on the received measurement report.

According to a third embodiment, a computer program product may be embodied on a non-transitory computer readable medium. The computer program product may be configured to control a processor to perform a method according to the first embodiment.

According to a fourth embodiment, a method may include receiving, by a second network node, a measurement split request from a first network node. The measurement split request designates a first measurement layer and a second measurement layer. The first measurement layer corresponds to a measurement configuration for the first network node, and the second measurement layer corresponds to a measurement configuration for the second network node. The method may also include determining whether the measurement split request is acceptable. The method may also include transmitting an acknowledgement that the measurement split request is accepted, if the measurement split request is determined to be acceptable.

In the method of the fourth embodiment, the first network node may include a first access point, and the second network node may include a second access point.

In the method of the fourth embodiment, the method may include receiving, by the second network node, a measurement report from the user equipment. The measurement report relates to secondary cells of the second network node.

In the method of the fourth embodiment, the method may also include performing a mobility/handover procedure based on the received measurement report within the second network node.

According to a fifth embodiment, an apparatus may include first receiving means to receive a measurement split request from a network node. The measurement split request designates a first measurement layer and a second measurement layer. The first measurement layer corresponds to a measurement configuration for the network node, and the second measurement layer corresponds to a measurement configuration for the apparatus. The apparatus may also include determining means to determine whether the measurement split request is acceptable. The apparatus may also include transmitting means to transmit an acknowledgement that the measurement split request is accepted, if the measurement split request is determined to be acceptable.

In the apparatus of the fifth embodiment, the network node may include a first access point, and the apparatus may include a second access point.

In the apparatus of the fifth embodiment, the apparatus may also include second receiving means to receive a measurement report from the user equipment. The measurement report relates to secondary cells of the apparatus.

In the apparatus of the fifth embodiment, the apparatus may also include performing means to perform a mobility/handover procedure based on the received measurement report within the secondary cells of the apparatus.

According to a sixth embodiment, a computer program product may be embodied on a non-transitory computer readable medium, the computer program product configured to control a processor to perform a method according to the fourth embodiment.

According to a seventh embodiment, a method may include receiving, by a user equipment, a measurement configuration for a first network node and a measurement configuration for a second network node. The measurement configuration for the first network node corresponds to a first measurement layer, the measurement configuration for the second network node corresponds to a second measurement layer, and a measurement split request designates the first measurement layer and the second measurement layer. The method may also include transmitting a first measurement report to the first network node. The method may also include transmitting a second measurement report to the second network node.

In the method of the seventh embodiment, the first network node may include a first access point, and the second network node may include a second access point.

In the method of the seventh embodiment, the first measurement report relates to secondary cells different than secondary cells of the second network node, and the second measurement report relates to the secondary cells of the second network node.

According to an eighth embodiment, an apparatus may include receiving means to receive a measurement configuration for a first network node and a measurement configuration for a second network node. The measurement configuration for the first network node corresponds to a first measurement layer, the measurement configuration for the second network node corresponds to a second measurement layer, and a measurement split request designates the first measurement layer and the second measurement layer. The apparatus may also include first transmitting means to transmit a first measurement report to the first network node. The apparatus may also include second transmitting means to transmit a second measurement report to the second network node.

In the apparatus of the eighth embodiment, the first network node comprises a first access point, and the second network node comprises a second access point.

In the apparatus of the eighth embodiment, the first measurement report relates to secondary cells different than secondary cells of the second network node, and the second measurement report relates to the secondary cells of the second network node.

According to a ninth embodiment, a computer program product may be embodied on a non-transitory computer readable medium. The computer program product may configured to control a processor to perform a method according to the seventh embodiment.

BRIEF DESCRIPTION OF THE DRAWINGS

For proper understanding of the invention, reference should be made to the accompanying drawings, wherein.

DETAILED DESCRIPTION

Certain embodiments of the present invention may be directed to implementing a split measurement configuration for different connections. An internal study relating to 5G small cells is directed to providing a disruptive approach for meeting the technical requirements that are expected to be established by the year 2020. The internal study is directed to providing support for 10000× more traffic, directed to providing a Round Trip Time (RTT) latency that is less than 1 ms, and directed to providing a flat energy consumption, for example.

From a mobility point of view, ensuring handover reliability and appropriate latency are considered to be important challenges to resolve, and resolving these challenges is considered to be a high priority when designing a given system. An optimal condition may be pursued, where the optimal condition is characterized by a zero handover latency (which corresponds to a condition without interruption). This optimal condition is pursued in order to hide the cell change from the UE, which provides the UE with the perception of uninterrupted service continuity.

5G systems may need to operate with very low latency because 5G is moving towards providing services relating to the tactile Internet and relating to mission-critical Machine Type Communication (MTC), where connections are used for distributed control, rather than for just communicating user data content.

The maximum data rate per device is expected to increase substantially, which means that an increase in air interface bandwidth must also be complemented by a decrease in air-interface latency. Latency issues can be addressed with multi-link control plane functions, which provide robustness and which enable preparation of control plane functions in advance, in order to provide seamless activation.

Figure 1:
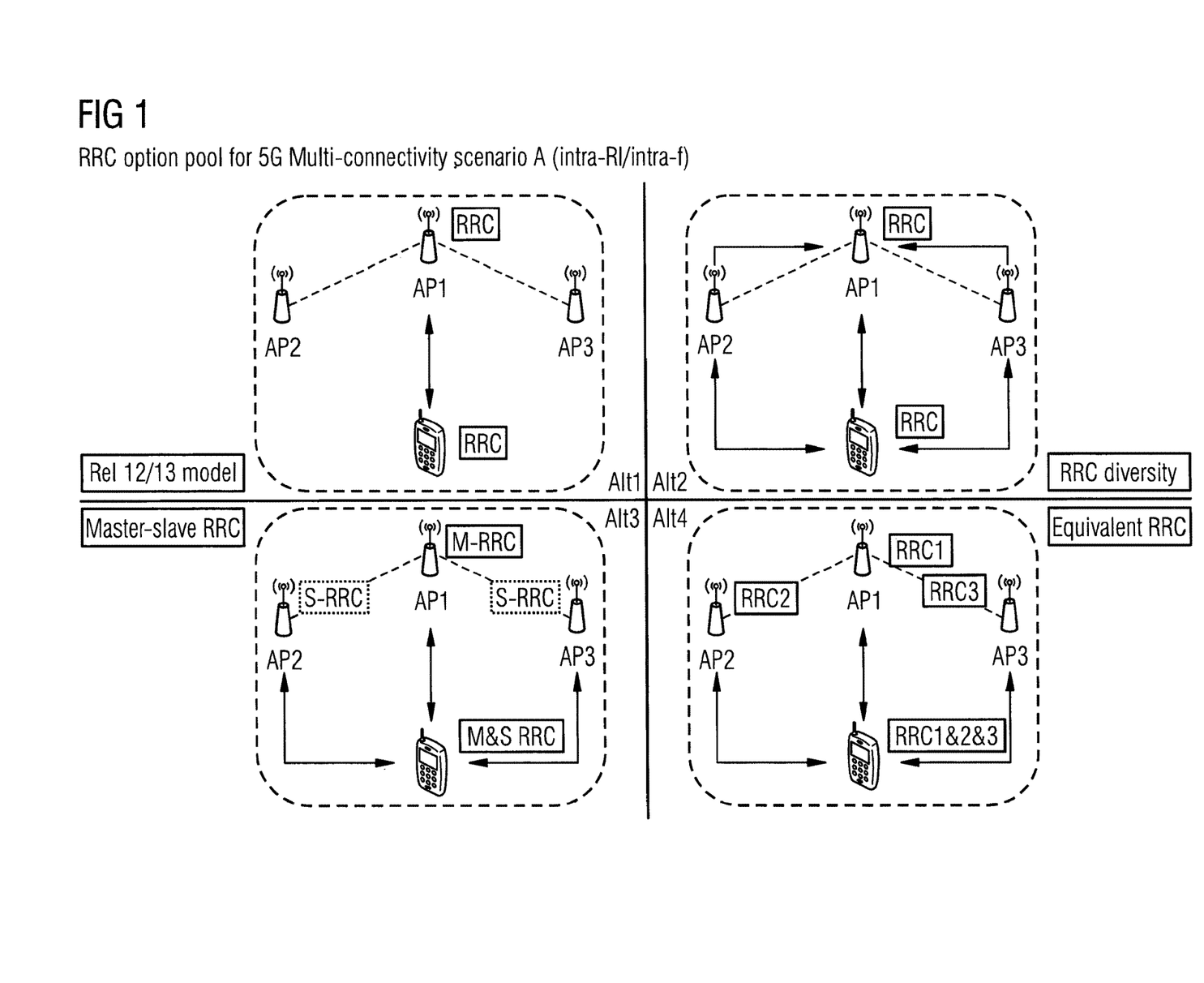
FIG. 1 illustrates different options for Radio Resource Control in 5G multi-connectivity.

FIG. 1 illustrates different options for Radio Resource Control in 5G, multi-connectivity. Radio Resource Control (RRC) options are illustrated in FIG. 1, where alternative 3 (master-slave RRC connection) and alternative 4 (equivalent RRC connection) include multiple RRC connections between a UE and a network side.

The proper method of performing measurement configuration and measurement reporting, with multiple RRC connections for one particular UE, is unclear, particularly in view of the fact that the method of handling multiple RRC connections should support a multi-connectivity mobility procedure. Certain embodiments of the present invention are directed to supporting a multi-connectivity mobility procedure.

With alternative 3 of FIG. 1 (the master-slave RRC concept), a functional split between a master-RRC (M-RRC) and a slave-RRC (S-RRC) is described below. With regard to the M-RRC, the M-RRC may receive a measurement report from a UE, and the M-RRC may make a decision to add/release other radio legs. The M-RRC may perform mobility control and may have control over RRC functionalities. The M-RRC may also take care of parameter negotiation among different Access points. The parameters to be negotiated may relate to a discontinuous reception, a measurement gap, a UE radio capability, and/or a single point setup (SPS), for example.

With regard to S-RRC, the S-RRC may be equipped with some legacy RRC functions. The legacy RRC functions may include, for example, fast-radio configuration. The S-RRC may only modify radio configurations for a link. No measurement report will be sent to the slave RRC.

Figure 2:
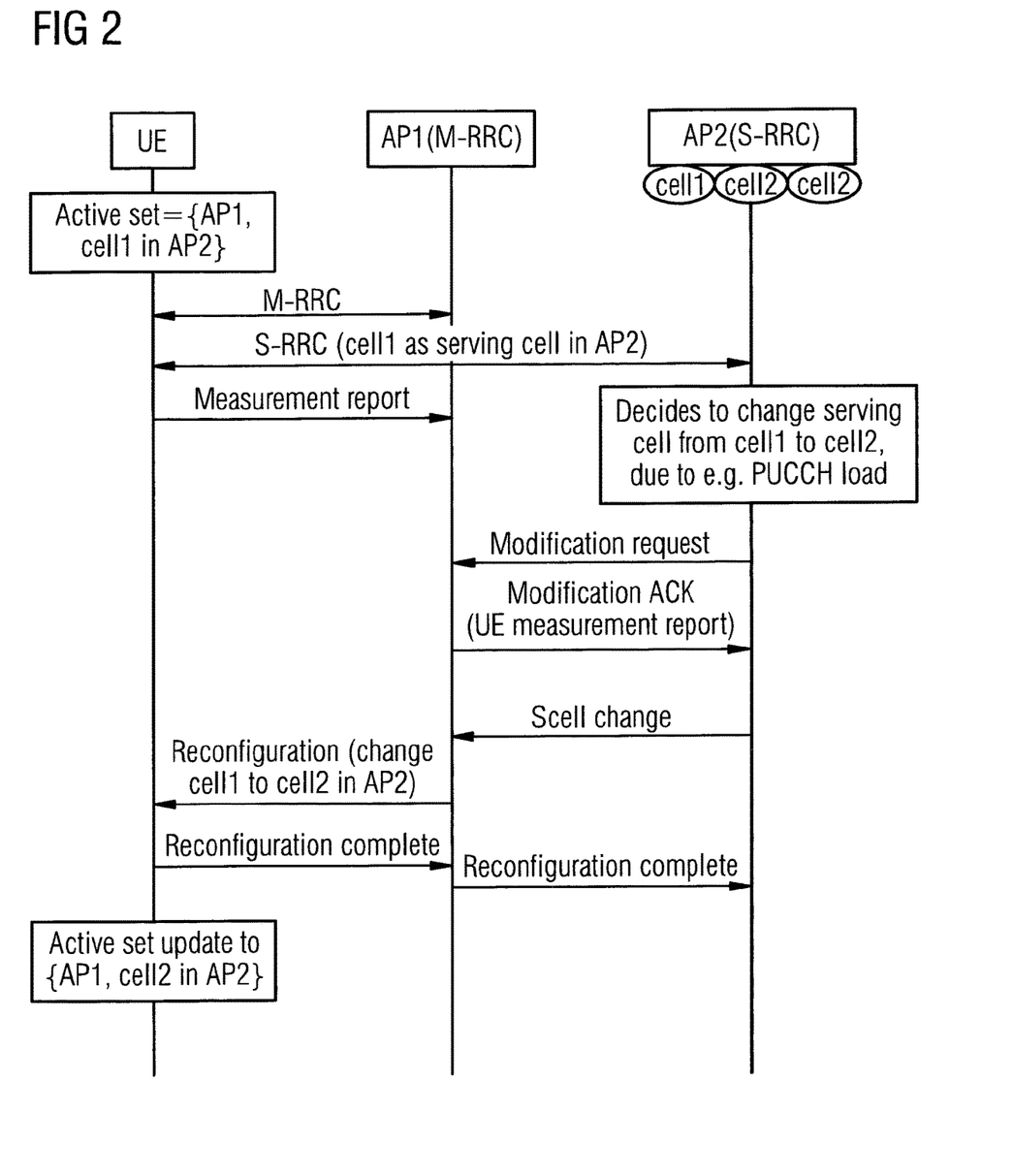
FIG. 2 illustrates mobility procedures for changing secondary cells of an access point.

Based on the above-described characteristics, certain embodiments are directed to a mobility signalling procedure, as shown by FIG. 2.

FIG. 2 illustrates mobility procedures for changing secondary cells of an access point (AP2). Referring to FIG. 2, the arrows corresponding to "Modification request," "Modification ACK," "SCell change," "Reconfiguration," and "Reconfiguration complete" represent steps which are performed to complete an SCell change procedure for AP2. Completion of the SCell change procedure for AP2 is visible to M-RRC in AP1, because all measurement reports are handled in M-RRC, i.e. S-RRC will not receive any measurement report, according to the above-described master-slave RRC concept. Measurement reports may need to be forwarded by AP1 to AP2, in order to help AP2 select a better candidate cell. As such, mobility handling within AP2 may necessarily involve AP1 (M-RRC).

However, the above-described method may not be the preferred method to perform mobility handling by AP2. If mobility within AP2 is controlled by S-RRC (as opposed to M-RRC), then mobility within AP2 may be hidden from AP1 (M-RRC). If mobility within AP2 may be hidden from AP1, such a method may be more efficient and may use less signalling overhead.

Figure 3:
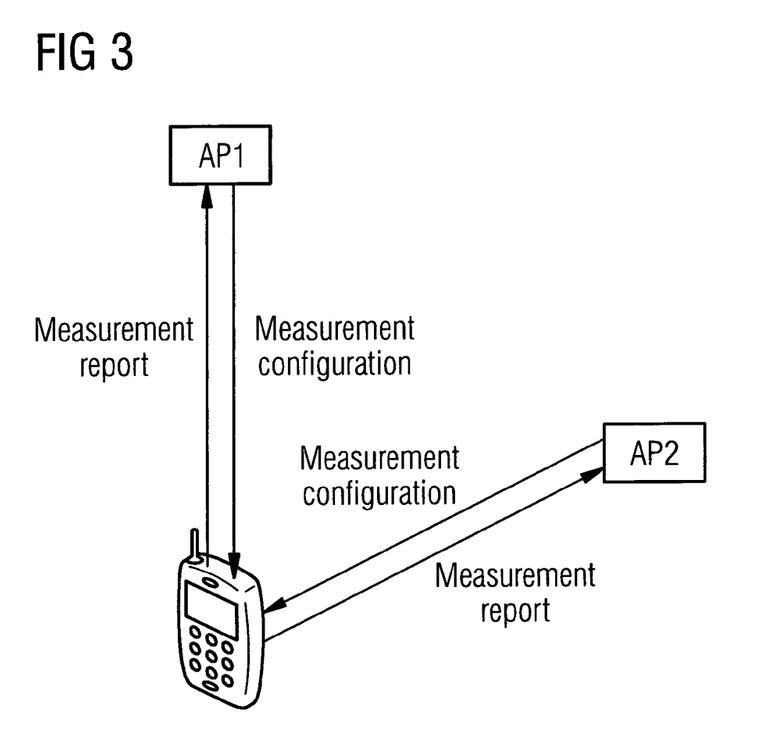
FIG. 3 illustrates a separate measurement and reporting configuration for multiple RRC connections.

With another approach, RRC connections can be separate from each other with regard to performing measurement configuration. FIG. 3 illustrates a separate measurement and reporting configuration. The configuration of FIG. 3 may provide the benefit of hiding mobility from AP1, which would be more relevant to alternative 4 (of FIG. 1). The configuration of FIG. 3 may achieve the benefit of hiding mobility with regard to intra-AP mobility, but the configuration of FIG. 3 may possibly not provide the benefit of hiding mobility with regard to inter-AP mobility. Further, if all RRC connections are assumed to be able to handle the measurement reports and mobility control independently, certain problems may still exist, as described in more detail below.

Figure 4:
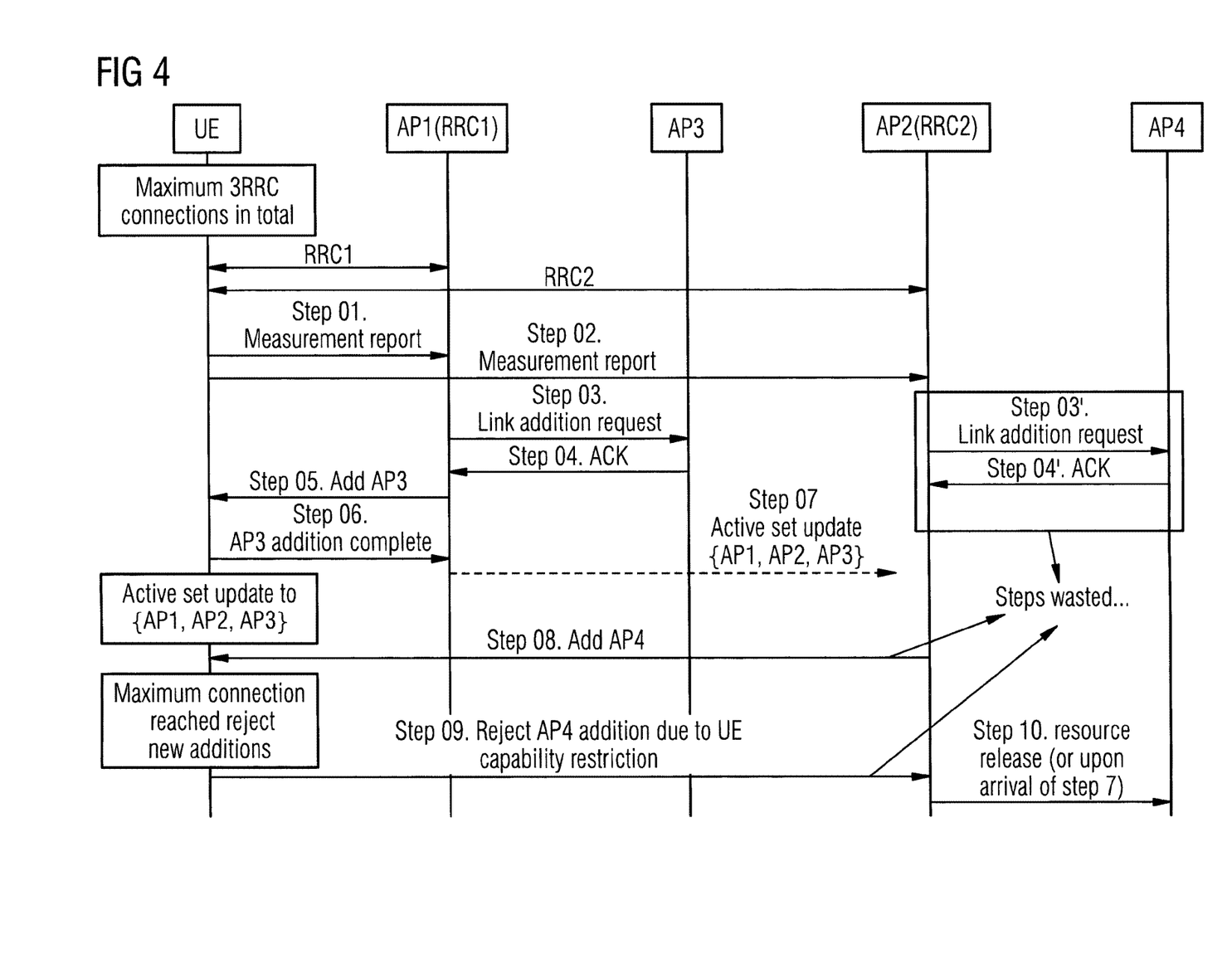
FIG. 4 illustrates signaling/resource waste that results from separate measurement handling.

FIG. 4 illustrates signalling/resource waste that results from separate measurement handling. Referring to FIG. 4, because each RRC could be able to perform the measurement control and mobility handling, each RRC could possibly select another target cell for handover/mobility. Therefore, multiple network-side preparation procedures may be performed in parallel, which may sometimes not be necessary, and which may lead to resource waste from a network perspective. So, one shortcoming of the equivalent RRC connection option is that this option may complicate mobility handling on the network side, and this option may result in wasted resources, as described above.

In view of the above-described shortcomings, it may be desirable to provide enhancements to the master-slave RRC model. These enhancements may provide a light measurement configuration in S-RRC that enables a light mobility control within AP2. Light mobility control generally means that S-RRC may only handle measurement/mobility within AP2, which may require that the measurements be split and that the mobility responsibility be coordinated at the beginning of a multi-connectivity session. Inter-AP handover may still need to be performed via M-RRC, accordingly.

With certain embodiments of the present invention, for multiple RRC connection operations in 5G multi-connectivity, measurement operations could be split via coordination between different RRC connections, regarding mobility management for the UE. Specifically, the measurement configuration could be divided between the two/multiple RRC connections so that the UE may be able to deliver the measurement report to different measurement layers, according to different measurement configurations. Different measurement layers may generally refer to different measurement configurations based on different mobility requirements of different RRC connections.

With certain embodiments of the present invention, network nodes may provide coordinated measurement layer configurations to UE. The network nodes may also assign an owner RRC to each measurement layer, to support delivery of measurement reports by the UE towards different network nodes. Certain embodiments may thus reduce a signalling overhead during multi-connectivity mobility procedures. For each involved network node, different steps may be performed, as described below.

With regard to the master network node (such as a master eNB/AP, for example), the master network node may coordinate with other network nodes. The master network node may coordinate with other network nodes via an X2AP protocol, for example. The master network node may coordinate with other network nodes about the measurement configuration, with regard to coordinating a mobility management scheme for performing multi-connectivity handling. The coordinating of the mobility management scheme may include performing layer-specific measurement handling. Different measurement layers may be handled by different RRC entities.

The master network node may configure the UE with different measurement layers when operating in a multi-connectivity session. The master network node may indicate an owner RRC (for example, a master or a slave RRC) of a respective measurement layer handling to the UE.

The master network node may receive measurement reporting from the UE, and the master network node may make the mobility decisions according to agreed upon coordination results. The agreed upon coordination results may correspond to layer specific measurement handlings.

With regard to a secondary network node (such as, for example, small cells/AP), the secondary network node may coordinate with a master network node about the measurement configuration, especially with mobility limitations with regard to UE capability. The secondary network node may coordinate with the master network node via X2AP protocol, for example. The secondary network node may also receive measurement reports from the UE and may also make the mobility decision, according to the result of the coordination. The secondary network node may perform layer-specific measurement handlings.

With regard to the UE (as shown in FIG. 4), the UE may be configured by the master network node, to utilize different measurement rules (to utilize different events and different thresholds, for example) for different measurement layers. The UE may deliver measurement reports toward correct network nodes in order to trigger mobility for specific measurement layers.

Based on the measurement layer differentiation operation, inter-AP mobility events (with AP3/AP4) may be handled by RRC 1. Intra-AP mobility events within AP2 may be handled by RRC 2, as shown by FIG. 4. Hence, no conflict mobility decisions will be made during a mobility procedure.

If a UE has not established any RRC connection to a network, then the UE will be in RRC idle mode.

Figures 5, 5A:
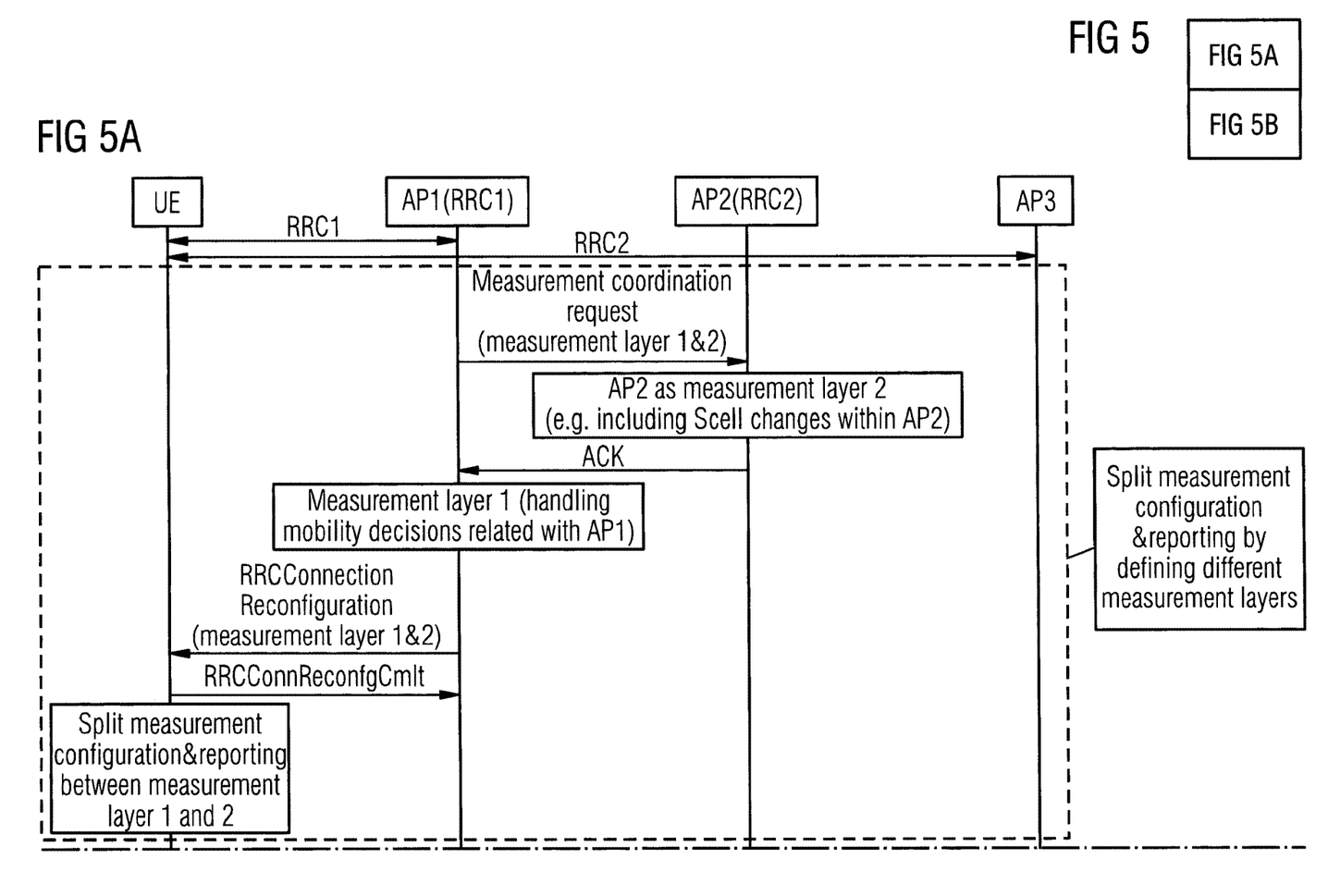
FIG. 5 illustrates Radio Resource Control connections that have been established between a user equipment and a network, in accordance with certain embodiments of the invention.
Figure 5B:
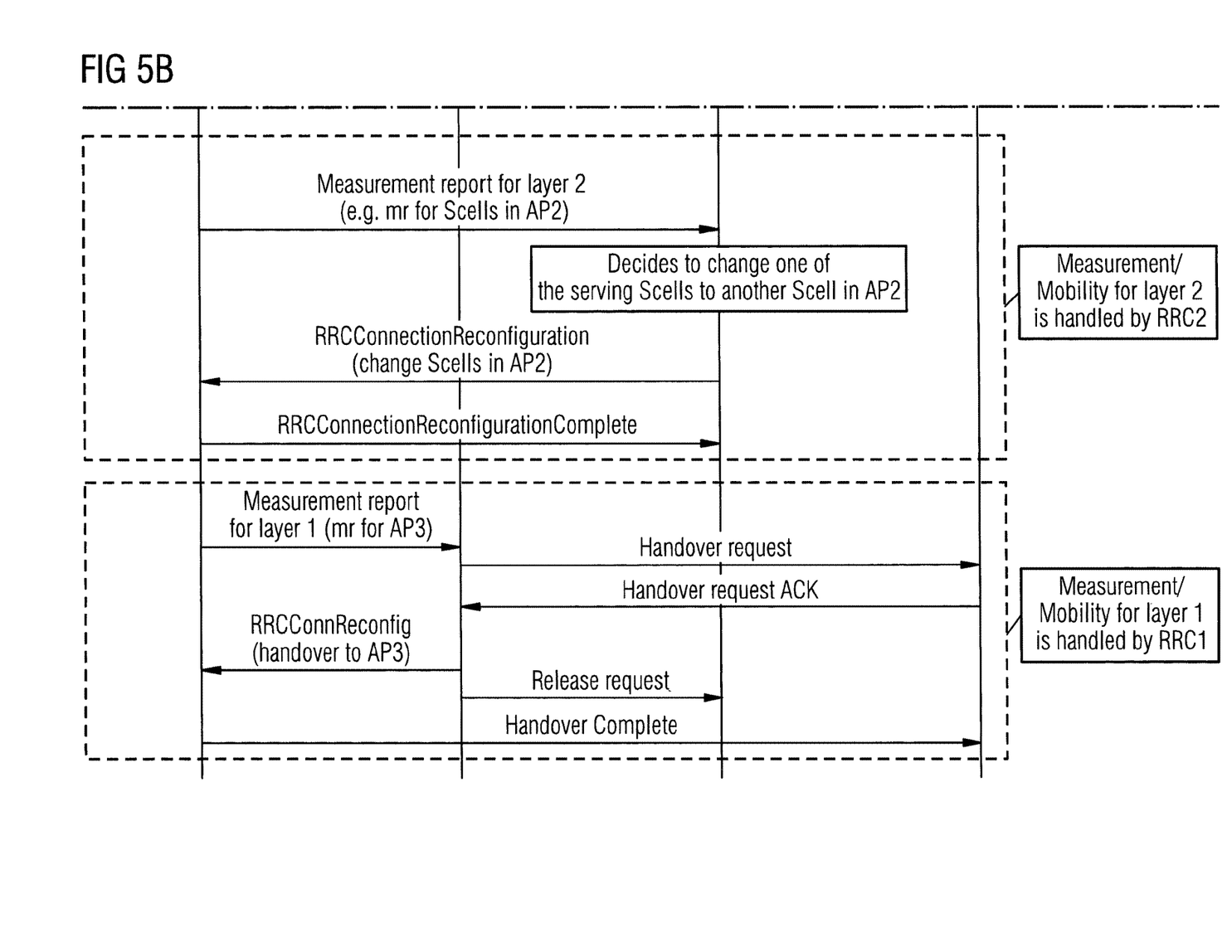

FIG. 5 illustrates Radio Resource Control connections that have been established between a user equipment and a network, in accordance with certain embodiments of the invention. Referring to FIG. 5, two RRC connections have been established between the UE and the network. One connection is RRC1 (between UE and AP1), and another connection is RRC2 (between UE and AP3).

AP1 triggers a measurement split request towards AP2, which includes the proposed measurement split to set a measurement configuration in AP1 as measurement layer 1 and a measurement configuration in AP2 as measurement layer 2. Measurement layer 2 will be relevant with mobility control for layer 2 as well. For example, mobility within layer 2 (such as intra-AP2 mobility, for example) will, as a result, be controlled by RRC 2.

AP2 checks the measurement split proposed by AP1, and AP2 may decide to accept the measurement split and reply with an ACK to AP1. The later measurement results related to SCells in AP1 will be configured to be reported to only AP1.

AP1 receives the ACK from AP2, constructs a measurement configuration for layers 1 and 2, and AP1 sends the measurement configuration to the UE via an RRC connection reconfiguration message. The RRC connection reconfiguration message may include an indication to the UE to deliver different measurement reports to different network nodes. More specifically, the RRC connection reconfiguration message may indicate to the UE to deliver measurement of SCells within AP2 to AP2, and the rest of the measurement reports are to be delivered to AP1. The SCells within AP2 may be indicated to the UE using a list of cell IDs, for example.

Based on the configuration of different measurement layers, the UE will perform measurement reporting accordingly. The UE may deliver measurement results to layer 2 (AP2) about the SCells in AP2. SCells change procedures that occur within AP2 may occur without informing AP1. Or, the UE could deliver measurement results towards layer 1 (AP1) to trigger the mobility/handover procedure towards AP3, which is not delivered to AP2 according to measurement layer separation.

The measurement configuration/reporting split between RRC1 and RRC2 may result in a mobility control split as well. For example, certain embodiments of the present invention perform "light" mobility control in AP2, without involving AP1 for intra-AP2 mobility procedures. For the mobility procedure involving other standalone APs, the mobility procedure may still belong to layer 1 and should be handled by RRC 1 (AP1).

In view of the above, certain embodiments of the present invention may implement a separate measurement configuration and reporting for different measurement layers, based on the coordination of different RRC connections. With certain embodiments, there may be no need to deliver the same measurement results to all RRC connections because such delivery may be unnecessary in some cases.

With certain embodiments, the UE could be able to send the measurement report to a correct network node in a more flexible way to fulfil different mobility requirements in different RRC connections.

With certain embodiments, a split measurement handling could help to hide mobility within AP2 from AP1, which will reduce the signalling overhead on the X2 interface between AP1 and AP2. Referring to FIG. 4, for intra-AP mobility events, certain embodiments can save 4 X2AP signalling, for each mobility event per UE.

Figure 6:
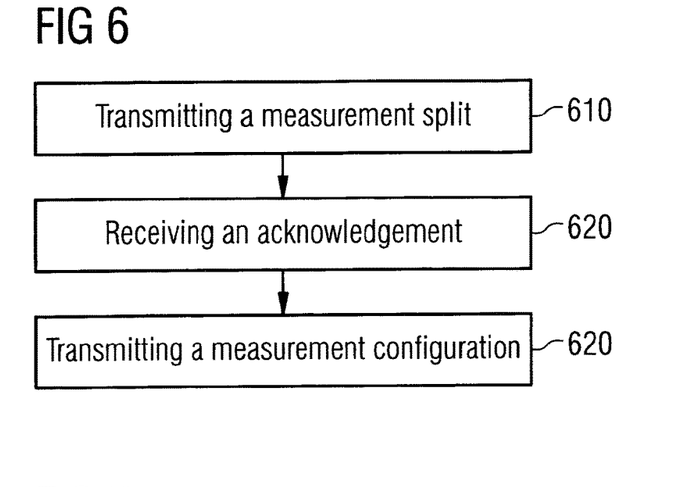
FIG. 6 illustrates a flowchart of a method in accordance with certain embodiments of the invention.

FIG. 6 illustrates a flowchart of a method in accordance with certain embodiments of the invention. The method illustrated in FIG. 6 includes, at 610, transmitting, by a first network node, a measurement split request to a second network node. The measurement split request designates a first measurement layer and a second measurement layer. The first measurement layer corresponds to a measurement configuration for the first network node. The second measurement layer corresponds to a measurement configuration for the second network node. The method may also include, at 620, receiving an acknowledgement that the measurement split request is accepted by the second network node. The method may also include, at 630, transmitting the measurement configuration for the first network node and the measurement configuration for the second network node to a user equipment.

Figure 7:
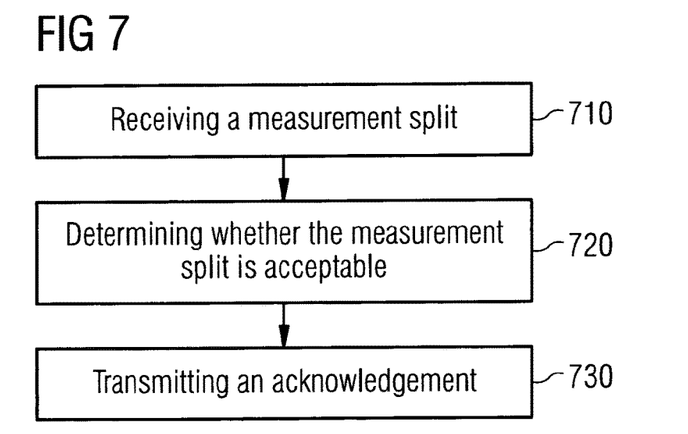
FIG. 7 illustrates a flowchart of another method in accordance with certain embodiments of the invention.

FIG. 7 illustrates a flowchart of a method in accordance with certain embodiments of the invention. The method illustrated in FIG. 7 includes, at 710, receiving, by a second network node, a measurement split request from a first network node. The measurement split request designates a first measurement layer and a second measurement layer. The first measurement layer corresponds to a measurement configuration for the first network node. The second measurement layer corresponds to a measurement configuration for the second network node. The method may also include, at 720, determining whether the measurement split request is acceptable. The method may also include, at 730, transmitting an acknowledgement that the measurement split request is accepted, if the measurement split request is determined to be acceptable.

Figure 8:
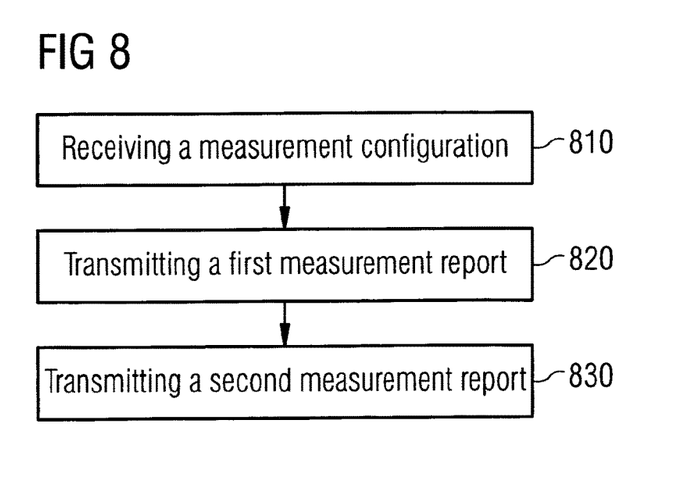
FIG. 8 illustrates a flowchart of another method in accordance with certain embodiments of the invention.

FIG. 8 illustrates a flowchart of another method in accordance with certain embodiments of the invention. The method illustrated in FIG. 8 includes, at 810, receiving, by a user equipment, a measurement configuration for a first network node and a measurement configuration for a second network node. The measurement configuration for the first network node corresponds to a first measurement layer. The measurement configuration for the second network node corresponds to a second measurement layer. A measurement split request designates the first measurement layer and the second measurement layer. The method may also include, at 820, transmitting a first measurement report to the first network node. The method may also include, at 830, transmitting a second measurement report to the second network node.

Figure 9:
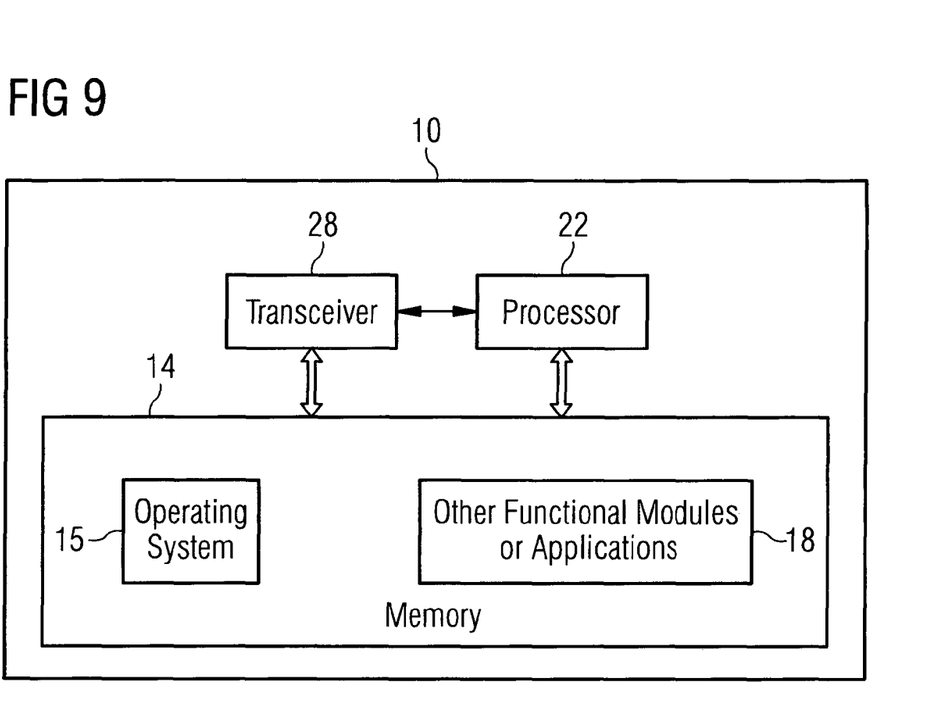
FIG. 9 illustrates an apparatus in accordance with certain embodiments of the invention.

FIG. 9 illustrates an apparatus 10 according to another embodiment. In an embodiment, apparatus 10 may be an end user device. In another embodiment, apparatus 10 may be an access point, base station, and/or an evolved Node B, for example.

Apparatus 10 includes a processor 22 for processing information and executing instructions or operations. Processor 22 may be any type of general or specific purpose processor. While a single processor 22 is shown in FIG. 9, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

Figure 10:
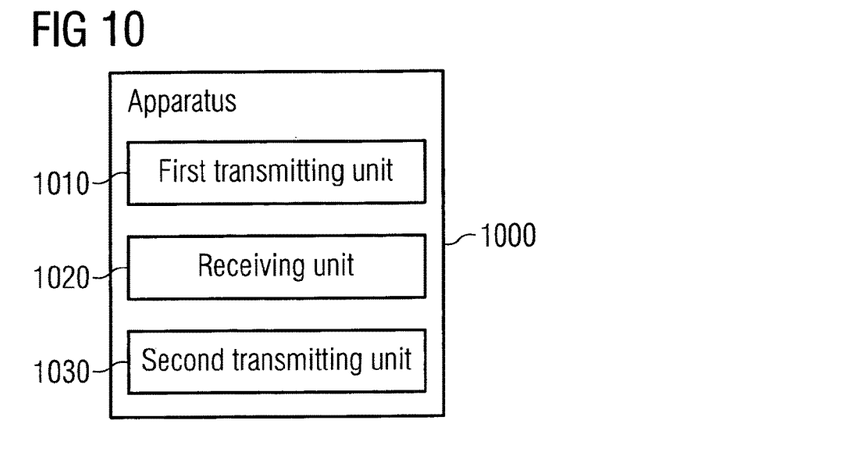
FIG. 10 illustrates another apparatus in accordance with certain embodiments of the invention.

FIG. 10 illustrates another apparatus in accordance with certain embodiments of the invention. Apparatus 1000 can be an access point, for example. Apparatus 1000 can include a first transmitting unit 1010 that transmits a measurement split request to a network node. The measurement split request designates a first measurement layer and a second measurement layer. The first measurement layer corresponds to a measurement configuration for the apparatus 1000. The second measurement layer corresponds to a measurement configuration for the network node. Apparatus 1000 can also include a receiving unit 1020 that receives an acknowledgement that the measurement split request is accepted by the network node. Apparatus 1000 can also include a second transmitting unit 1030 that transmits the measurement configuration for the apparatus 1000 and the measurement configuration for the network node to a user equipment.

Figure 11:
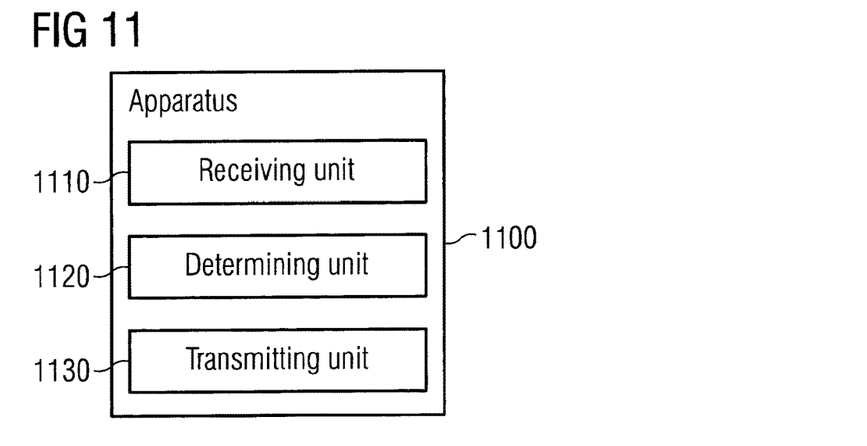
FIG. 11 illustrates another apparatus in accordance with certain embodiments of the invention.

FIG. 11 illustrates another apparatus in accordance with certain embodiments of the invention. Apparatus 1100 can be an access point, for example. Apparatus 1100 can include a receiving unit 1110 that receives a measurement split request from a network node. The measurement split request designates a first measurement layer and a second measurement layer. The first measurement layer corresponds to a measurement configuration for the network node. The second measurement layer corresponds to a measurement configuration for the apparatus 1110. Apparatus 1100 can also include a determining unit 1120 that determines whether the measurement split request is acceptable. Apparatus 1100 can also include a transmitting unit 1130 that transmits an acknowledgement that the measurement split request is accepted, if the measurement split request is determined to be acceptable.

Figure 12:
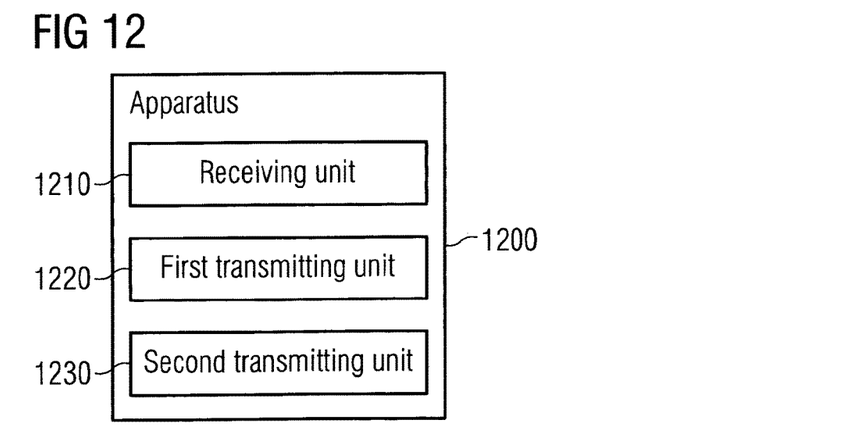
FIG. 12 illustrates another apparatus in accordance with certain embodiments of the invention.

FIG. 12 illustrates another apparatus in accordance with certain embodiments of the invention. Apparatus 1200 can be a user equipment, for example. Apparatus 1200 can include a receiving unit 1210 that receives a measurement configuration for a first network node and a measurement configuration for a second network node. The measurement configuration for the first network node corresponds to a first measurement layer. The measurement configuration for the second network node corresponds to a second measurement layer. A measurement split request designates the first measurement layer and the second measurement layer. Apparatus 1200 can also include a first transmitting unit 1220 that transmits a first measurement report to the first network node. Apparatus 1200 may also include a second transmitting unit 1230 that transmits a second measurement report to the second network node.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
transmitting, by a first network node to a second network node, a measurement split request to implement a separate user equipment measurement configuration and reporting to different network nodes, wherein the measurement split request designates the first measurement layer and the second measurement layer for the user equipment to perform measurements, the first measurement layer corresponds to the first measurement configuration for the first network node and the second measurement layer corresponds to the second measurement configuration for the second network node;
receiving an acknowledgement that the measurement split request is accepted by the second network node; and
transmitting the first measurement configuration for the first network node and the second measurement configuration for the second network node to the user equipment, the first measurement configuration for the first network node and the second measurement configuration for the second network node including an indication to the user equipment to deliver a first measurement report to the first network node and a second measurement report to the second network node, respectively, the first measurement report being different from the second measurement report, wherein at least the first measurement report is used by the first network node to assist in performing a mobility or handover procedure for the user equipment.

2. The method according to claim 1, wherein the first network node comprises a first access point, and the second network node comprises a second access point.

3. The method according to claim 1, further comprising:
receiving, by the first network node, the first measurement report from the user equipment, wherein the first measurement report relates to secondary cells different than secondary cells of the second network node.

4. The method according to claim 3, further comprising:
performing a mobility/handover procedure based on the received first measurement report.

5. A computer program product, embodied on a non-transitory computer readable medium, the computer program product configured to control a processor to perform a method according to claim 1.

6. A method, comprising:
receiving, by a user equipment, a measurement split request for the user equipment to implement a separate measurement configuration and reporting to different network nodes, and a first measurement configuration for a first network node and a second measurement configuration for a second network node, wherein the first measurement configuration for the first network node corresponds to a first measurement layer, the second measurement configuration for the second network node corresponds to a second measurement layer, the measurement split request designating the first measurement layer and the second measurement layer for the user equipment to perform measurements, the first measurement configuration for the first network node and the second measurement configuration for the second network node including an indication to the user equipment to deliver a first measurement report to the first network node and a second measurement report to the second network node;
transmitting the first measurement report to the first network node; and
transmitting the second measurement report to the second network node,
wherein the first measurement report is different from the second measurement report; and
wherein at least one of the first measurement report or the second measurement report is used to assist in performing a mobility or handover procedure for the user equipment.

7. The method according to claim 6, wherein the first network node comprises a first access point, and the second network node comprises a second access point.

8. The method according to claim 6, wherein the first measurement report relates to secondary cells different than secondary cells of the second network node, and the second measurement report relates to the secondary cells of the second network node.

9. An apparatus comprising at least one processor and at least one memory including computer instructions, when executed by the at least one processor, cause the apparatus to:
receive, by a user equipment, a measurement split request for the user equipment to implement a separate measurement configuration and reporting to different network nodes, and a first measurement configuration for a first network node and a second measurement configuration for a second network node, wherein the first measurement configuration for the first network node corresponds to a first measurement layer, the second measurement configuration for the second network node corresponds to a second measurement layer, the measurement split request designating the first measurement layer and the second measurement layer, the first measurement configuration for the first network node and the second measurement configuration for the second network node including an indication to the user equipment to deliver a first measurement report to the first network node and a second measurement report to the second network node;
transmit the first measurement report to the first network node; and
transmit the second measurement report to the second network node,
wherein the first measurement report is different from the second measurement report; and
wherein at least one of the first measurement report or the second measurement report is used to assist in performing a mobility or handover procedure for the user equipment.

10. The apparatus according to claim 9, wherein the first network node comprises a first access point, and the second network node comprises a second access point.

11. The apparatus according to claim 9, wherein the first measurement report relates to secondary cells different than secondary cells of the second network node, and the second measurement report relates to the secondary cells of the second network node.

12. A computer program product, embodied on a non-transitory computer readable medium, the computer program product configured to control a processor to perform a method according to claim 6.

13. The method of claim 1 wherein the measurement configuration for the first network node includes a first set of measurement rules, and the measurement configuration for the second network node includes a second set of measurement rules that are different than the first set of measurement rules.

14. The method of claim 13 wherein the first and second sets of measurement rules include a different event and/or a different threshold for triggering a measurement report.

15. The method of claim 6 wherein:
inter-node handovers of the user equipment between network nodes are controlled by the first network node; and intra-node handovers of the user equipment within the second network node are controlled by the second network node.

* * * * *